United States Patent [19]

Saha

[11] Patent Number: 4,680,777

[45] Date of Patent: Jul. 14, 1987

[54] QUADRATURE-QUADRATURE PHASE SHIFT KEYING

[75] Inventor: Debabrata Saha, Ann Arbor, Mich.

[73] Assignee: The University of Michigan, Ann Arbor, Mich.

[21] Appl. No.: 640,057

[22] Filed: Aug. 13, 1984

[51] Int. Cl.$^4$ ............... H04L 27/10; H04J 11/00; H03C 3/00
[52] U.S. Cl. ............... 375/53; 375/67; 375/86; 370/20; 332/23 R
[58] Field of Search ............... 375/38, 53, 54, 67, 375/86, 102, 122; 329/124, 125; 332/22, 23 A, 23 R; 370/11, 20, 21, 118; 381/31, 33

[56] References Cited

U.S. PATENT DOCUMENTS

| | | | |
|---|---|---|---|
| 3,204,034 | 8/1965 | Ballard et al. | 370/21 |
| 3,204,035 | 8/1965 | Ballard et al. | 370/21 |
| 3,517,131 | 6/1970 | Becker | 375/38 |
| 3,622,885 | 11/1971 | Kruszynski et al. | 375/38 |
| 3,697,682 | 10/1972 | Berg | 370/118 |
| 4,267,591 | 5/1981 | Wissel et al. | 370/11 |
| 4,338,579 | 7/1982 | Rhodes | 332/22 |
| 4,384,357 | 5/1983 | de Buda et al. | 329/124 |
| 4,406,009 | 9/1983 | Lender | 375/43 |

OTHER PUBLICATIONS

"Carriers", *Data Communications Dictionary*, Sippl, Van Nostrand Reinhold Company, 1976.

*Primary Examiner*—Robert L. Griffin
*Assistant Examiner*—Andrew J. Telesz, Jr.
*Attorney, Agent, or Firm*—Rohm & Monsanto

[57] ABSTRACT

Methods for modulating and demodulating digital data streams utilize a quadrature-quadrature phase shift keying data transmission arrangement to achieve a 100% increase in the bandwidth efficiency over known systems, such as minimum shift keying. Known arrangements utilize two dimensional data transmission. However, Q$^2$PSK, in accordance with the invention, provides four dimensional transmission which doubles the rate of data transmission for a given bandwidth, at the expense of approximately 45% increase in the average energy per bit. The input data stream is demultiplexed to form four demultiplexed data streams which are formed of demultiplexed data bits. Each such data stream is combined with a signal having carrier and data pulse-shaping components. Additionally, the data pulse-shaping components have a quadrature phase relationship with each other, thereby adding the additional two dimensions of data transmission capacity.

18 Claims, 13 Drawing Figures

STAGGERING OF DATA PULSES IN OQPSK

STAGGERING OF DATA PULSES IN MSK

QUADRATURE-QUADRATURE PHASE SHIFT KEYING

BACKGROUND OF THE INVENTION

This invention relates generally to transmission and modulation systems for digital data, and more particularly, to a digital data modulation system wherein bandwidth efficiency and the data transmission rate are improved by demultiplexing the digital data into a plurality of data channels, wherein the data pulses are shaped by signals having preselected characterizing functions, illustratively sinusoidal and cosinusoidal functions which have a quadrature phase relationship.

Spectral congestion due to ever increasing demand for digital transmission calls for spectrally efficient modulation schemes. Spectrally efficient modulation can be loosely said to be the use of power to save bandwidth, much as coding may be said to be the use of bandwidth to save power. In other words the primary objective of a spectrally efficient modulation scheme is to maximize the bandwidth efficiency (b), defined as the ratio of data rate ($R_b$) to channel bandwidth (W). Since a signal can not be both strictly duration-limited and strictly band-limited, there are two approaches in designing a spectrally efficient data transmission scheme. One is the band-limiting approach; the other is the time-limiting approach. In the former, a strictly bandlimited spectral shape is carefuly chosen for the data pulse so as to satisfy the Nyquist criterion of zero intersymbol interference (ISI). In the latter, the data pulse is designed to have a short duration and the definition of bandwidth is somewhat relative depending on the situation involved. The latter approach is followed herein.

Like bandwidth, power is also a costly resource in radio transmission. So another objective in designing a high rate data transmission scheme is to reduce the average energy per bit ($E_b$) for achieving a specified bit error rate (BER). The bit error rate performance of two schemes are usually compared under the assumption of an ideal channel corrupted only by additive white Gaussian noise (AWGN). Suppose the two sided power spectral density of noise is $N_o/2$. Then a standard parameter for comparing two modulation schemes is the energy efficiency (e); it is the ratio $E_b/N_o$ required to achieve a BER of $10^{-5}$.

The energy efficiency mostly depends on the signal space geometry. The bandwidth efficiency depends on two factors; firstly the basic waveforms of the data shaping pulses and secondly the utilization of all possible signal dimensions available within the given transmission bandwidth. In data communication, the motion of increasing the rate of transmission by increasing the number of dimensions became prominent when people switched from binary phase shift keying (BPSK) to quadrature phase shift keying (QPSK). Modulation studies during the last fifteen years proposed several modifications of QPSK. Of these, offset quadrature phase shift keying (OQPSK) and minimum shift keying (MSK) have gained popularity because of their several attributes. So any new spectrally efficient scheme ought to be tested in the light of the spectral efficiencies of these two.

BPSK is an antipodal signalling scheme; it uses two opposite phases (0° and 180°) of the carrier to transmit binary +1 and −1. Thus BPSK signal space geometry is one dimensional. QPSK, on the other hand, can be considered as two BPSK systems in parallel; one with a sine carrier, the other with a cosine carrier of the same frequency. QPSK signal space is thus two dimensional. This increase in dimension without altering the transmission bandwidth increases the bandwidth efficiency by a factor of two. Spectral compactness is further enhanced in MSK by using a cosinusoidal data shaping pulse instead of the rectangular one of QPSK. Though MSK over QPSK use different data shaping pulses, their signal space geometries are the same. Both of them use a set of four biorthogonal signals. So the spectral compactness achieved in MSK and QPSK should be distinguished from the compactness achieved in QPSK over BPSK. In the former compactness comes from the shaping of the data pulse, while in the later it comes from increasing the dimension within the given transmission bandwidth.

To see the possibility of any further increase in dimension without increasing the transmission bandwidth substantially, one has to look into the time-bandwidth product. It is a mathematical truth that the space of signals essentially limited in time to an interval $\tau$ and in one sided bandwidth occupancy to W is essentially $2\tau W$-dimensional. Though this bound on dimension is true for the best choice of orthonormal set (prolate spheroidal wave functions [4]), yet it will justify the reasoning behind any search for higher dimensional signal sets to achieve higher bandwidth efficiency. In both QPSK and MSK, signal duration $\tau$ is 2T, where T is the bit interval in the incoming data stream. Suppose the channel is bandlimited to 1/2T on either side of the carrier, i.e. one sided bandwidth occupancy is $W=1/T$. With such a bandlimited channel a QPSK system will be able to transmit only ninety percent of its total power while an MSK system transmits ninety seven percent. The number of dimensions available within this bandwidth $W=1/T$ is $2\tau W=4$. It is surprising that only two of them are utilized in QPSK and MSK. The remaining two are yet left to be played around with. So one can conceive of a modulation scheme with a bandwidth efficiency as much as twice that of QPSK or MSK. Since prolate spheroidal wave functions are not easy to implement, expectation of one hundred percent increase in bandwidth efficiency may be too much from a practical view point. Yet the extra two dimensions give some room for improving the bandwidth efficiency by increasing the dimensionality of the signal set at the cost of some extra bandwidth, if necessary.

First we briefly review some existing modulation schemes such as QPSK, OQPSK and MSK, all of which use two dimensional signal sets. Then we propose a new modulation scheme which uses the vertices of a hyper cube of dimension four as the signal space geometry. This proposed scheme makes use of two data shaping pulses and two carriers which are pairwise quadrature in phase; so it is named quadrature-quadrature phase shift keying or $Q^2PSK$. It is pointed out as a theorem that in the presence of AWGN any modulation scheme which utilizes the vertices of some hyper cube as signal space geometry has the same energy efficiency; this is true for any dimension of the hyper cube. As a consequence of the theorem, $Q^2PSK$ has the same energy efficiency as that of MSK, QPSK or OQPSK; but for a given bandwidth the transmission rate of $Q^2PSK$ is twice that of any one of the three other schemes. However, all these four schemes respond differently when they undergo bandlimiting. Considering ninety nine percent bandwidth of MSK as the definition of channel bandwidth, it is shown that $E_b/N_o$ requirement for achieving a BER of $10^6$ is 11.2 db for bandlimited $Q^2$PSK and 9.6 db for MSK. Thus bandlimited $Q^2$PSK achieves twice bandwidth efficiency of MSK only at the expense of 1.6 db or forty five percent increase in the average bit energy. Like MSK, $Q^2$PSK has also self synchronization ability. Modulator-demodulator implementation and a scheme for synchronization will be described in detail in the last section.

BRIEF REVIEW OF QPSK, OQPSK and MSK

A block diagram of the QPSK modulation scheme is shown in FIG. 1. The input binary data stream $\{a_1\}$ arriving at the rate of $1/T$ is demultiplexed into two streams $a_1(t)$ and $a_2(t)$. The duration of each bit in the demultiplexed streams is twice the duration of the incoming bit. Streams $a_1(t)$ and $a_2(t)$ are multiplied by sine and cosine carriers and summed up to form the QPSK signal $s_{qpsk}(t)$:

$$S_{qpsk}(t) = \frac{1}{\sqrt{2}} a_1(t)\cos\left(2\pi f_c t + \frac{\pi}{4}\right) + \frac{1}{\sqrt{2}} a_2(t)\sin\left(2\pi f_c t + \frac{\pi}{4}\right)$$

$$= \cos(2\pi f_c t + \phi(t))$$

(1)

where $\phi(t)$, depending on $a_1(t)$ and $a_2(t)$, is one of $0°$, $\pm 90°$ and $180°$. Thus carrier phase during any 2T interval is one of the four phases. In the next 2T interval, if neither of the two bit streams changes sign, the carrier phase remains the same. If one of them changes sign, a phase shift of $\pm 90°$ occurs. A change of sign in both streams causes a phase shift of $180°$. Rapid changes in the carrier phase has serious deteriorating effects on the signal and the adjacent channel when it undergoes bandlimiting and hardlimiting operations. Those deteriorating effects are partially eliminated in offset quadrature phase shift keying (OQPSK) where the two bit streams are not allowed to change their sign simultaneously, thus avoiding the possibility of 180° phase shift. This is accomplished by skewing or delaying the bit stream $a_2(t)$ by an amount of time T as illustrated in FIG. 2. By pulse shaping, further elimination of changes in the carrier phase is possible. In fact, it is totally eliminated in minimum shift keying (MSK) where a cosinusoidal data shaping pulse is used in place of the rectangular one of OQPSK, as illustrated in FIG. 2. This pulse shaping in MSK also brings some spectral compactness over OQPSK. The MSK signal can be written as:

$$S_{msk}(t) = a_1(t)\cos\left(\frac{\pi t}{2T}\right) \cos(2\pi f_c t) +$$

$$a_2(t)\sin\left(\frac{\pi t}{2T}\right) \sin(2\pi f_c t)$$

$$= \cos\left[2\pi\left(f_c + \frac{b(t)}{4T}\right) t + \phi(t)\right]$$

(2)

where $b(t) = -a_1(t)a_2(t)$ and $\phi(t) = 0$ are $\pi$ according to $a_1 = +1$ or $-1$. Thus MSK signals can have one of two instantaneous frequencies, $f_c \pm (1/4T)$. The spacing between the two frequencies is $1/2T$. This is the minimum spacing with which two FSK signals of duration T can be orthogonal; hence the name minimum shift keying (MSK).

It is, therefore, an object of this invention to provide a method for transmitting data wherein bandwidth efficiency is improved over known transmission systems.

It is another object of this invention to provide a digital transmission system wherein all four available dimensions are utilized.

It is a further object of this invention to provide a digital data transmission system wherein a significant increase in data transmission capacity is achieved, for a given bandwidth requirement, at the expense of only a modest increase in energy per bit.

It is also an object of this invention to provide a transmission system wherein data transmission capacity can be effectively doubled without producing intolerable intersymbol interference.

SUMMARY OF THE INVENTION

The foregoing and other objects are achieved by this invention which provides an information transmission method wherein digital data, in the form of a data stream is demultiplexed to form several, illustratively four, demultiplexed data streams. Each of the demultiplexed data streams is modulated by a respective modulating signal having a carrier component and a pulse-shaping component. The pulse-shaping components in the respective modulating signals have a quadrature phase relationship and are preferably sinusoidal and cosinusoidal.

Preferably the carrier components of the respective modulating signals are also in a quadrature phase relationship, and therefore, four dimensions of data transmission are achieved; two for the carrier and two for the data pulses in the demultiplexed data streams. Such a four dimensional transmission system has a doubled data transmission capacity over conventional systems, without requiring any additional bandwidth. The enhanced capacity is achieved at the expense of a modest increase in the energy per bit.

In accordance with a further aspect of the invention, four streams of data pulses are modulated simultaneously by combining a pulse-shaping signal with first and second carrier signal components. Each of the carrier signal components has the same frequency as the other, but with a quadrature phase relationship. Such a combination produces first and second composite modulation signals, each having first and second frequency components. In one embodiment of the invention, the first and second frequency components are symmetrical about a base carrier frequency. The first and second frequency components associated with each of the composite modulation signals are combined subtractively to produce a first pair of modulation signals, and additively to produce a second pair of modulation signals. The four modulation signals are combined with respective ones of the streams of data pulses, thereby producing four modulated streams of pulses having predetermined pulse shapes and quadrature pulse phase relationships with respect to each other.

In accordance with a still further aspect of the invention, a modulated information signal is demodulated by subjecting it to various stages of non-linear operation. In one embodiment of the invention, the modulated information signal is squared. The squared modulated information signal is subjected to low pass filtering to extract a frequency-limited component, and to band pass filtering for extracting a predetermined frequency component corresponding to a multiple of the frequency of the carrier signal. In a preferred embodiment, the frequency component has twice the frequency of the carrier signal. The extracted frequency-limited and predetermined frequency components are subjected a further non-linear operation. In one embodiment, where the further non-linear operation is a signal squaring, first and second timing signals corresponding to the frequency of the information in the modulated information signal, and the frequency of the carrier signal, are extracted therefrom.

BRIEF DESCRIPTION OF THE DRAWINGS

Comprehension of the invention is facilitated by reading the following detailed description in conjunction with the annexed drawings, in which.

DETAILED DESCRIPTION

Figure 3:
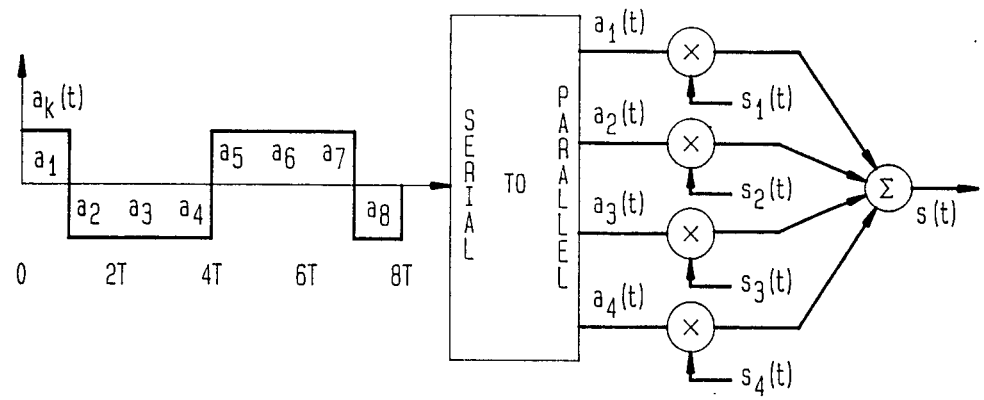
FIG. 3 is a function block and partially schematic representation of a $Q^2$PSK modulator constructed in accordance with the invention.

FIG. 3 is a function block representation of a $Q^2$PSK modulator constructed in accordance with the principles of the invention. As shown therein, an input data stream $a_k(t)$ which is demodulated via a serial to parallel converter into four demultiplexed data streams, $a_1(t)$ to $a_4(t)$.

Let us consider the following basis signal set:

$$s_1(t) = \cos(\pi t/2T) \cos 2\pi f_c t, \quad |t| \leq T \quad (3a)$$

$$s_2(t) = \sin(\pi t/2T) \cos 2\pi f_c t, \quad |t| \leq T \quad (3b)$$

$$s_3(t) = \cos(\pi t/2T) \sin 2\pi f_c t, \quad |t| \leq T \quad (3c)$$

$$s_4(t) = \sin(\pi t/2T) \sin 2\pi f_c t, \quad |t| \leq T \quad (3d)$$

$$s_i(t) = 0, \, i=1,2,3,4, \quad |t| \leq T \quad (3e)$$

We write, $$p_1(t) = \cos(\pi t/2T) \text{ and} \quad (4a)$$

$$p_2(t) = \sin(\pi t/2T) \quad (4b)$$

Later $p_1(t)$ and $p_2(t)$, which are quadrature in phase, will be identified as data shaping pulses, and sine and cosine functions of frequency $f_c$ as carriers. It is to be noted that between any two signals in the set $\{s_i(t)\}$, there is a common factor which is either a data shaping pulse or a carrier component; the remaining factor in one is in quadrature with respect to the remaining factor in the other. This makes $\{s_i(t)\}$ a set of four equal-energy orthogonal signals under the restriction:

$$f_c = n/4T, \, n = \text{integer} \geq 2 \quad (5)$$

Also the orthogonality remains invariant under the translation of the time origin by multiples of 2T, which is the duration of each signal. In other words, if the definition of $s_i(t)$ in (3) be extended for all t, then one will get orthogonality over every interval of 2T centered around $t=2mT$, m being an integer.

The orthogonality of $\{s_i(t-2mT)\}$ suggests a modulation scheme, a schematic diagram of which is shown in FIG. 3. Data from an IID binary ($\pm 1$) source at a rate 2/T is demultiplexed into four streams $\{a_i(t)\}$; duration of each data pulse (rectangular shaped with strengths $\pm 1$) in the demultiplexed streams being 2T. Each data stream $a_i(t)$ is multiplied by the output $s_i(t)$ of a signal generator which continuously emits, $s_i(t)$, defined over all t. The multiplied signals are summed to form the modulated signal s(t).

At the receiver, suppose four identical coherent generators are available. Then one can make observations over intervals of length 2T and use the orthogonality of $\{s_i(t-2mT)\}$ to separate out the data streams. A correlation receiver can perform this process of demodulation in an optimum sense of minimum probability of error in the presence of white Gaussian noise.

Figure 4:
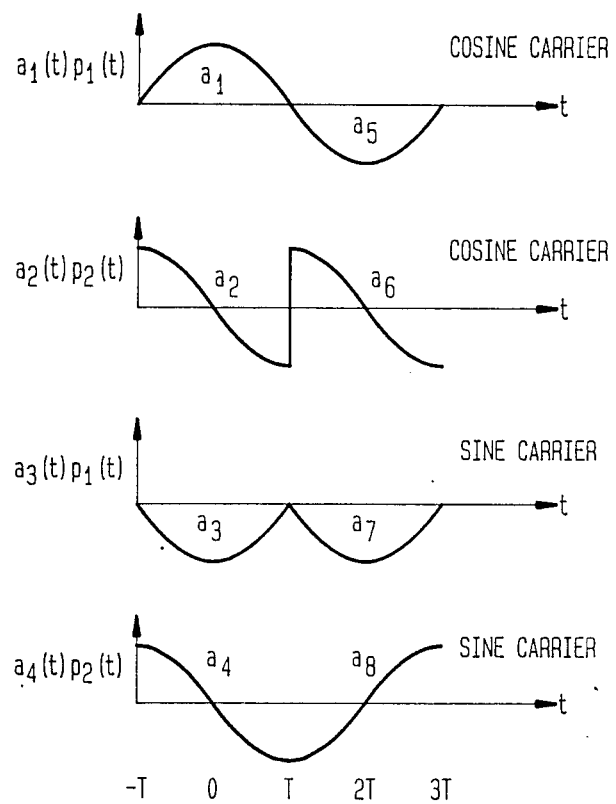
FIG. 4 is a timing diagram showing the waveforms of the various demultiplexed signals.

The modulating signal $s_i(t)$ has two fold effect on the bit streams $a_i(t)$: one is the wave shaping of the data pulse; the other is the translation of the baseband spectrum to a bandpass region. Shaping of the data pulses is illustrated in FIG. 4. It is to be noted that the two pulse trains associated with either carrier are orthogonal over any interval of integer multiple of 2T. This makes sense because the dimensionality of the signal set used in this scheme is four; two of them come from the orthogonality of the carriers, the remaining two from the orthogonality of the data shaping pulses $p_1(t)$ and $p_2(t)$. In other words, two carriers and two data shaping pulses are pairwise quadrature in phase. Hence the modulation scheme is named Quadrature-Quadrature Phase Shift Keying ($Q^2$PSK).

The bit rate $R_b = 2/T$ of the input of the modulation in FIG. 3 is twice the bit rate we considered for QPSK and MSK schemes in the last section. This increase in the rate of transmission is due to increase in the signal space dimensions and as conjectured earlier, will result in a substantial increase in the bandwidth efficiency. But for a quantative comparison of the bandwidth efficiencies of $Q^2$PSK and MSK one needs to know the spectral occupancy of the Q²PSK signal. This aspect of the invention will be discussed hereinbelow.

From the schematic diagram in FIG. 3, one can represent the Q²PSK signal as:

$$S_{q2psk}(t) = a_1(t)\cos\left(\frac{\pi t}{2T}\right)\cos(2\pi f_c t) + \quad (6a)$$

$$a_2(t)\sin\left(\frac{\pi t}{2T}\right)\cos(2\pi f_c t) +$$

$$a_3(t)\cos\left(\frac{\pi t}{2T}\right)\sin(2\pi f_c t) +$$

$$a_4(t)\sin\left(\frac{\pi t}{2T}\right)\sin(2\pi f_c t)$$

$$= \cos[2\pi(f_c + b_{14}(t)/4T)t + \phi_{14}(t)] + \quad (6b)$$
$$\sin[2\pi(f_c + b_{23}(t)/4T)t + \phi_{23}(t)]$$

where, $$b_{14}(t) = -a_1(t)a_4(t) \quad (7a)$$

$$\phi_{14}(t) = 0 \text{ or } \pi \text{ according as } a_1(t) = +1 \text{ or } -1 \quad (7b)$$

and, $$b_{23}(t) = +a_2(t)a_3(t) \quad (8a)$$

$$\phi_{23}(t) = 0 \text{ or } \pi \text{ according as } a_3(t) = +1 \text{ or } -1 \quad (8b)$$

Thus at any instant the Q²PSK signal can be analyzed as consisting of two signals; one is cosinusoidal with frequency either of $(f_c \pm 1/4T)$, the other is sinusoidal with frequency either of $(f_c \pm 1/4T)$. The separation between the two frequencies associated with either of the two signals is 1/2T; this is the minimum spacing that one needs for coherent orthogonality of two FSK signals as in MSK. Also a comparison with (2) shows that the cosinusoidal part of Q²PSK signal in (6b) exactly represents an MSK signal. Therefore the Q²PSK signalling scheme can be thought as consisting of two minimum shift keying type signalling schemes, which, in some loose sense, are in quadrature with respect to each other. Since the two schemes are in quadrature, one can intuitively think that overall energy efficiency will be the same as that of conventional MSK with cosinusoidal shape of data pulse.

FIG. 4 shows the wave shaping of the data pulses in the Q²PSK signal. As shown in this specific illustrative embodiment of the invention, the data pulses have either sinusoidal or cosinusoidal shapes, thereby providing a quadrature phase relationship therebetween. However, other pulse shapes having the quadrature phase relationship may be used in the practice of the invention.

ENERGY EFFICIENCY

An ultimate objective of all data communication systems is to reduce the bit error rate (BER) at the expense of a minimum amount of average bit energy $(E_b)$. In practice, BER performance is usually evaluated under the assumption of an ideal channel corrupted only by additive white Gaussian noise with two sided spectral density $N_o/2$. The receiver is assumed to be an optimum one, e.g. a correlation receiver, which maximizes the probability of correct decision. A standard quantitative parameter for measuring BER performance is th energy efficiency (e); it is the ratio $E_b/N_o$ required to achieve a BER $P_b(E) = 10^{-5}$.

The signal set $\{s_1(t)\}$ used in Q²PSK is of dimension N=4. Each $s_1(t)$ represents one of four co-ordinate axes. With respect to this set of axes, a Q²PSK signal can be represented as:

$$s(t) = [a_1(t), a_2(t), a_3(t), a_4(t)] \quad (9)$$

where the coordinates $a_1(t)$'s can have only one of two values $\pm 1$ with probability one half. The number of signals in the Q²PSK signal set is $2^4$. The signals are equally probable and of equal energy, say $E_s$. Also it is easy to check that they represent the vertices of a hyper cube of dimension N=4; the center of the cube being at the origin of the coordinate axes. For this signal space geometry, the signal error probability for any N, [5] is given by:

$$P_s(E) = 1 - (1-p)^N \quad (10)$$

where, $$p = Q(\sqrt{2E_s/NN_o}) \quad (11a)$$

and $$Q(v) = \sqrt{\tfrac{1}{2\pi}} \int_v^\infty \exp(-x^2/2)dx \quad (11b)$$

Knowing signal error probability, one has upper and lower bound on bit error probability given by:

$$\tfrac{1}{2}P_s(E) \leq P_b(E) \leq P_s(E) \quad (12)$$

However an exact calculation of $P_b(E)$ is of considerable interest for comparing ttwo modulation schemes. To do that we establish the following theorem.

Theorem:

In the presence of additive white Gaussian noise (AWGN) any modulation scheme which uses the vertices of some hyper cube as signal space geometry and an optimum receiver for detection has identical bit error probability given by:

$$P_b(E) = Q\left(\sqrt{\frac{2E_b}{N_o}}\right) \quad (13)$$

where $E_b$ is the average bit energy and $N_o/2$ is the two sided spectral density of AWGN. This probability of error holds for any dimension N of the hyper cube. The hyper cube is assumed to be placed symmetrically around the origin to minimize the requirement of average bit energy.

Proof:

Suppose the hyper cube is of dimension N. Then the number of signals in the modulated signal set is $2^N$; each of these signals represents a combination of N bits. If $P_{bi}(E)$ is the probability of error in the $i^{th}$ bit position, then the average bit error probability is:

$$P_b(E) = \frac{1}{N} \sum_{i=1}^{N} P_{bi}(E) = P_{b1}(E) \quad (14)$$

where the last equality comes form the equality of $P_{bi}(E)$ for all i because of the symmetry in signal space geometry. To calculate $P_{b1}(E)$ let us divide the signals into two groups: $\{(+1, a_2, a_3 \ldots a_N)\}$ and its image partner $\{(-1, a_2, a_3, \ldots a'_N)\}$, where $a_i$'s can be either of $\pm 1$ with probability one half. These two groups of signals will lie on two parallel hyper planes of dimension $(N-1)$. Then one can imagine another hyper plane of the same dimension which separates the two groups on its two sides and is equidistant from each group. The distance of any signal in either group from the midway hyper plane is $$\frac{d}{2} = \sqrt{E_s/N} = \sqrt{E_b} .$$

Thus the signals with $+1$ in the first bit position are on one side of this plane at a distance $\sqrt{E_b}$ while the signals with $-1$ in the first bit position are on the other side at the same distance. So an error in the first bit position occurs only when the noise component n(t) associated with this bit position drives a signal down to the other side of the hyper plane. The probability of such an incident is:

$$P_{b1}(E) = \int_{\sqrt{E_b}}^{\infty} P_n(x)dx = Q\left(\sqrt{\frac{2E_b}{N_o}}\right) \quad (15)$$

where $p_n(x)$ is the probability density function of Gaussian noise with two sided spectral density $N_o/2$. Hence the overall bit error probability is:

$$P_b(E) = P_{b1}(E) = Q\left(\sqrt{\frac{2E_b}{N_o}}\right) \quad (16)$$

Since we have not assumed any particular value for N, probability of error given by (16) is valid for any dimension N of the hyper cube; hence the theorem.

From equation (10) one may observe that as N becomes infinitely large, signal error probability, $P_s(E)$ goes to unity; this is true because if signal energy $E_s$ is fixed and dimension gets higher and higher, the signals become closer and closer. On the other hand, the above theorem asserts a bit error probability $P_b(E)$ independent of the dimension N. The explanation of this apparent contradiction lies in the following fact: in the derivation of the theorem we assumed a fixed bit energy $E_b$ So the signal energy $E_s$ no longer remains fixed; it increases linearly with the increase in dimension N. Thus the distance between the two hyper planes containing $\{(+1, a_1, a_2, \ldots a_N)\}$ and $\{(-1, a_1, a_2, \ldots a_N)\}$ remains fixed at $d = 2\sqrt{E_b}$ and therefore, $p_b(E) = Q(\sqrt{2E_b/N_O})$ remains fixed while $P_S(E)$ does go to unity $P_s(E)$ nor $P_b(E)$ goes to unity. In fact the above theorem illustrates that the hyper cube signal space geometry coupled with equally probable use of all vertices is equivalent to two-dimensional antipodal geometry.

The bit error probability given by the theorem implies a 9.6 db energy efficiency. BPSK uses two antipodal signals which can be considered as the vertices of a hyper cube of dimension one. Similarly QPSK and MSK, which use a set of four biorthogonal signals, can be considered as using the vertices of a hyper cube of dimension two. And $Q^2$PSK uses the vertices of a hyper cube of dimension four. So all of BPSK, QPSK, OQPSK, MSK and $Q^2$PSK belong to the same class of signalling schemes which use vertices of some hyper cube, and each of them has an energy efficiency 9.6 db; this is true when the channel is wide band corrupted by AWGN only. If, in addition, the channel is bandlimited, as it happens to be in most practical situations, each of the five schemes responds differently Due to intersymbol interference signal space geometry no long remains hyper cube and the energy efficiency is changed. To analyze the energy efficiency in bandlimited situation one needs to know about the spectral distribution of power and the effect of bandlimiting on signal space geometry. We will do those analysis in the next section.

SPECTRAL DENSITY AND EFFECT OF BANDLIMITING

Spectral Density:

One can represent a $Q^2$PSK signal as:

$$S_{q2psk}(t) = \frac{1}{\sqrt{T}} a_1(t)P_1(t)\cos 2\pi f_c t + \frac{1}{\sqrt{T}} a_2(t)P_2(t)\cos 2\pi f_c + \quad (17)$$

$$\frac{1}{\sqrt{T}} a_3(t)P_1(t)\sin 2\pi f_c t + \frac{1}{\sqrt{T}} a_4(t)P_2(t)\sin 2\pi f_c t$$

where the additional $1/\sqrt{T}$ is just a normalizing factor to make $$\frac{1}{\sqrt{T}} \cos\left(\frac{\pi t}{2T}\right) \text{ and } \frac{1}{\sqrt{T}} \sin\left(\frac{\pi t}{2T}\right)$$

unit energy pulses. Data streams $a_1(t)$[18] are independent and at any instant each $a_1(t)$ can be either $+1$ or $-1$ with probability one half. So the $Q^2$PSK signal can be one of sixteen possible equally probable waveforms. Let us represent these waveforms by $m_1(t)$, i varying from 1 to 16. Probability of occurrence of $m_1(t)$ is $p_1 = 1/16$ for all i. The signal set $\{m_1(t)\}$ has the following characteristics (i) for each waveform $m_1(t)$, there is also a waveform $-m_1(t)$ (ii) the probability of $m_1(t)$, and $-m_1(t)$ are equal (iii) the transitional probabilities between any two waveforms are the same.

Such a signalling source is said to be negative equally probable (NEP); the overall spectral density is given by [6]:

$$S_{q2psk}(f) = \sum_{\pi=1}^{16} p_1|M_1(f)|^2 \quad (18)$$

where $M_1(f)$ is the Fourier transform of $m_1(t)$. One can reasonably assume the carrier frequency $f_c \gg 1/T$; then for $f > 0$, each $M_1(f)$ is one of the following sixteen possible combinations:

$$\tfrac{1}{4}[\pm P_1(f-f_c) \pm P_2(f-f_c) \pm jP_1(f-f_c) \pm jP_2(f-f_c)]$$

where $P_1(f)$ and $P_2(f)$ are the Fourier transforms of data shaping pulses normalizes $P_{1n}(t)$ and $P_{2n}(t)$ given by:

$$p_{1n}(t) = \frac{1}{\sqrt{T}} \cos \frac{\pi t}{2T} \Big|_{-T}^{T} \quad (19)$$

$$p_{2n}(t) = \frac{1}{\sqrt{T}} \sin \frac{\pi t}{2T} \Big|_{-T}^{T} \quad (20)$$

Substituting the $M_1(f)$'s into (18) and noticing that all cross terms are cancelled out, one can write:

$$S_{q2psk}(f) = \frac{1}{2} [|P_1(f - f_c)|^2 + |P_2(f - f_c)|^2] \quad (21)$$

The equivalent baseband version of the spectral density is:

$$S^b_{q2psk}(f) = \frac{1}{2} [|P_1(f)|^2 + |P_2(f)|^2] \quad (22)$$

The Fourier transforms of the data shaping pulses are:

$$P_1(f) = \frac{4\sqrt{T}}{\pi} \left( \frac{\cos 2\pi fT}{1 - 16f^2T^2} \right) \quad (23)$$

$$P_2(f) = \frac{j16\sqrt{T}}{\pi} \left( \frac{fT\cos 2\pi fT}{1 - 16f^2T^2} \right) \quad (24)$$

Substituting (23) and (24) into (22), the spectral density is found to be:

$$\frac{1}{T} S^b_{q2psk}(f) = \left( \frac{8}{\pi^2} \right) (1 + 16f^2T^2) \left( \frac{\cos 2\pi fT}{1 - 16f^2T^2} \right)^2 \quad (25)$$

Similarly spectral densities of MSK and OQPSK signalling schemes [2] are given by:

$$\frac{1}{T} S^b_{msk}(f) = \left( \frac{16}{\pi^2} \right) \left( \frac{\cos 2\pi fT}{1 - 16f^2T^2} \right)^2 \quad (26)$$

$$\frac{1}{T} S^b_{oqpsk}(f) = 2 \left( \frac{\sin 2\pi fT}{2\pi fT} \right)^2 \quad (27)$$

where in all cases:

$$\int_{-\infty}^{\infty} S^b(f) df = 1$$

Figure 5:
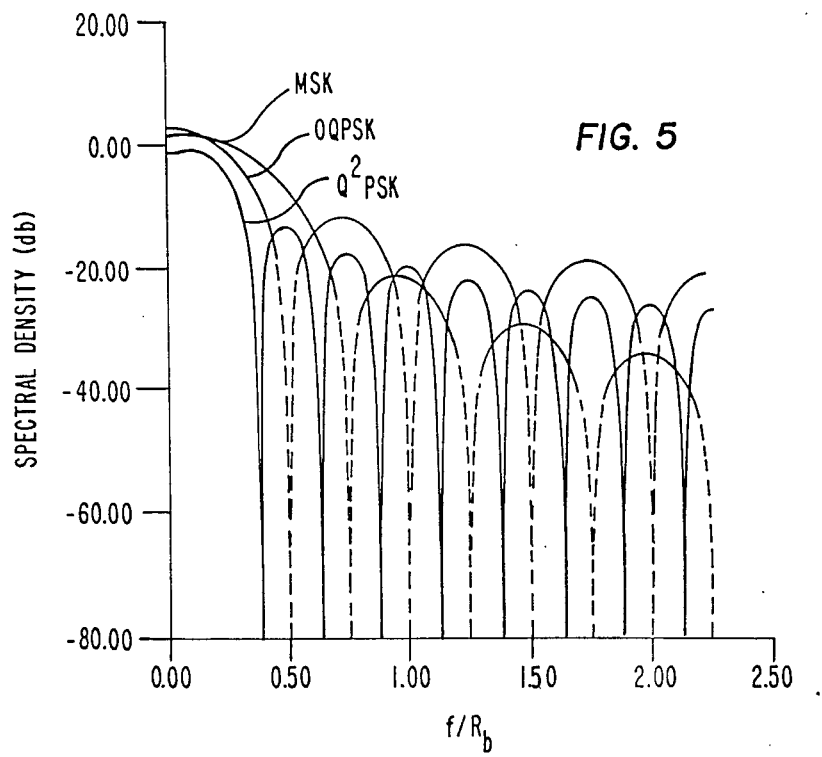
FIG. 5 is a graphical representation of the spectral densities of OQPSK, MSK, and $Q^2$PSK.

Spectral densities of OQPSK, MSK and Q²PSK are sketched in FIG. 5 as a function of normalized frequency $f/R_b$, where $R_b$, the bit rate, is $1/T$ for MSK and $2/T$ for Q²PSK. It should be noted that for a given bit rate, the width of the main lobe in Q²PSK is just one-half of the width of the MSK main lobe. Q²PSK uses two different kinds of data pulses; one is $P_1(t)$ having a cosinusoidal shape as in MSK, the other is $P_2(t)$ having a sinusoidal shape. The shape of $P_1(t)$ is smoother than $P_2(t)$ in the sense that the later has jumps at $t = \pm T$; as a result, for large f, the spectral fall-off associated with $P_2(t)$ is proportional of $f^{-2}$ while that with $P_1(t)$ is as $f^{-4}$. The faster fall-off associated with cosinusoidal shape causes lower side lobes in MSK; side lobes in OQPSK and Q²PSK are of the same order in magnitude but relatively higher than those of MSK. But just looking at the spectral lobes does not give any quantitative feelings about the spectral efficiencies; for that we need a measure of spectral compactness.

Figure 6:
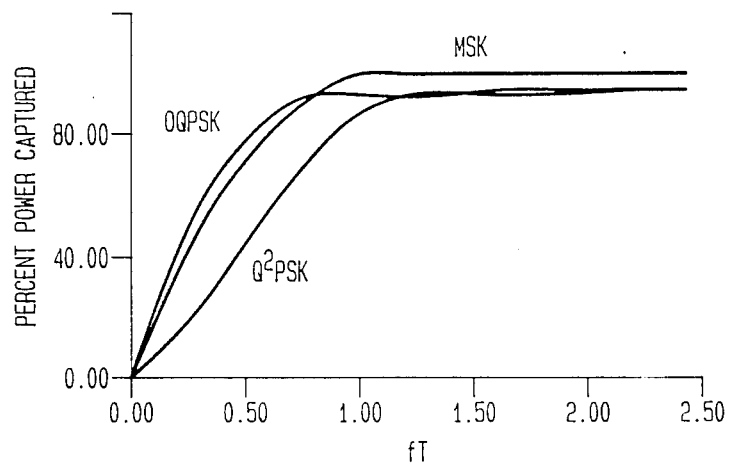
FIG. 6 is a graphical representation of the percentage of power captured as a function of bandwidth for OQPSK, MSK, and $Q^2$PSK.

A measure of spectral compactness is the percent of total power captured in a specified bandwith. This is plotted in FIG. 6. For small bandwidth, the percent power captured in Q²PSK is smaller than that in OQPSK and MSK. Beyond a bandwidth of 1.2/T, the asymptotic behavior of QPSK and Q²PSK become almost identical because of their same type of spectral fall-off $f^{-2}$. MSK captures 99.1% of total spectral power in a bandwidth of $W = 1.2/T$. With the same bandwidth power captured in QPSK and Q²PSK are 90.6 and 91.13 percent respectively. Thus MSK seems to be more spectrally compact than Q²PSK; yet bandwidth efficiency of Q²PSK is higher because its data transmission rate is twice that of MSK. An exact calculation of bandwidth efficiency depends on the definition of bandwidth and the effect of bandlimiting on signal space geometries.

But before carrying out the bandlimiting analysis, a few comments on the spectral fall-off of Q²PSK are worth mentioning. In contrast to MSK, the asymptotic spectral fall-off in Q²PSK is as $f^{-2}$; this is due to abrupt discontinuities in the data pulse $P_2(t)$ at $t = \pm T$. So, in an attempt to achieve higher spectral compactness one may suggest a smoother pulse for $P_2(t)$. A reasonable suggestion is to replace the half sinusoid by a full sinusoid over $|t| \leq T$; this avoids the sharp discontinuities at $t = \pm T$ and results in MSK like asymptotic spectral fall-off as $f^{-4}$. But when the transmission band is finite and is below the asymptotic region, asymptotic fall-off has little to do with the spectral efficiency; strength of the first few lobes becomes a primary factor. So, in spite of faster spectral fall-off in the new Q²PSK, its spectral compactness ought to be compared with that of Q²PSK with half sinusoid as $P_2(t)$. Henceforth whenever we discuss the two Q²PSK cases together, we denote the half sinusoid case as Q²PSKH and the full sinusoid case as Q²PSKF.

The baseband spectral density of Q²PSKF- signal is given by $$\frac{1}{T} S^b_{q2psk}(f) = \frac{8}{\pi^2} \left( \frac{\cos 2\pi fT}{1 - 16f^2T^2} \right)^2 + \frac{2}{\pi^2} \left( \frac{\sin 2\pi fT}{1 - 4f^2T^2} \right)^2 \quad (28)$$

Figure 7:
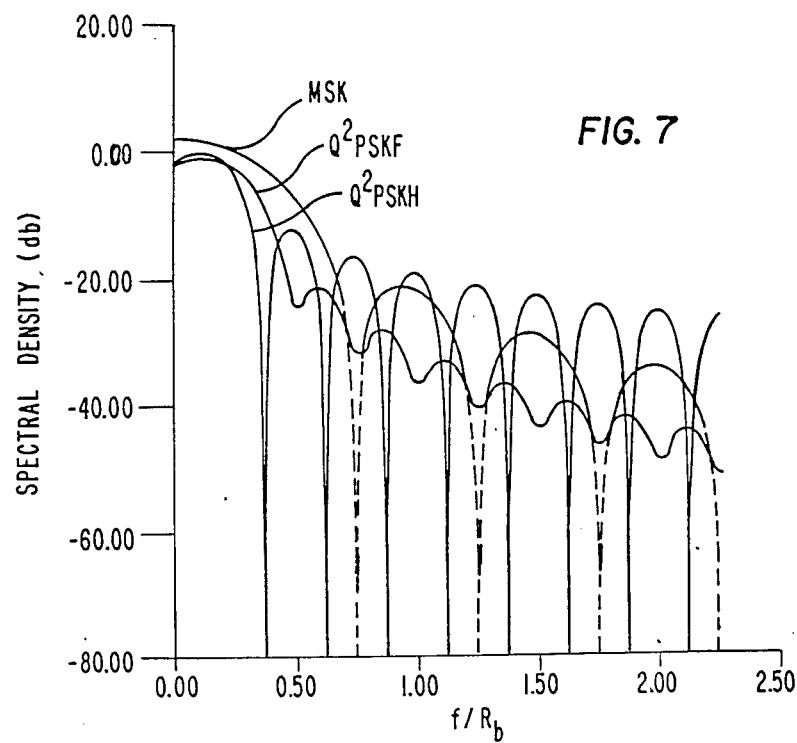
FIG. 7 is a graphical representation comparing the spectral densities of MSK, $Q^2$PSKH, and $Q^2$PSKF modulated signals.
Figure 8:
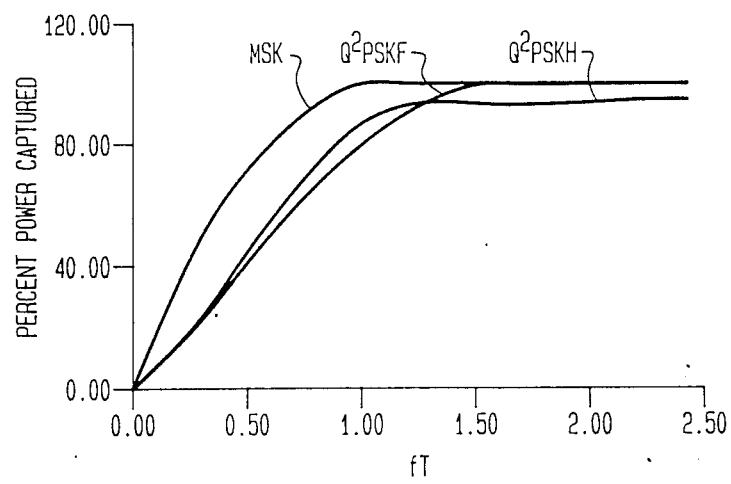
FIG. 8 is a graphical representation of the percentage of power captured as a function of bandwidth for MSK, $Q^2$PSKH, and $Q^2$PSKF modulated signals.

For the sake of a clear comparison, the spectral densities of MSK and Q²PSKH are once again plotted in FIG. 7 along with the spectral density of Q²PSKF. The main lobe of Q²PSKF is wider than that of Q²PSKH; compared to Q²PSKH, the side lobes of Q²PSKF are relatively lower in strength. FIG. 8 compares the spectral compactness of Q²PSKH and MSK; it shows that unless the bandwidth exceeds 1.25/T, the percent power captured by Q²PSKF is less than that with either Q²PSKH and MSK. With a bandwidth of 1.25/T, which is the 99% power bandwidth of MSK, Q²PSKF captures 89.90% while Q²PSKH 91.13% of total power. Thus in spite of asteer asymptotic spectral fall-off, Q²PSKF captures almost the same (in fact a little less) power as Q²PSKH. But to make a precise statement about which of the two schemes is more energy efficient, one needs to look into the effect of bandlimiting on signal space geometries and their consequences on energy efficiencies. We now do the analysis on bandlimiting.

Effect of Bandlimiting:

Consider as existing MSK scheme which allows a bandwidth of 1.2/T so that almost the entire spectrum (99.1%) power) is available at the receiver. Suppose the MSK modulator is replaced by a $Q^2PSK$ modulator and the modulator output, before transmission, is bandlimited to 1.2/T around the carrier frequence $f_c$. Our object is to compare the energy and the bandwidth efficiencies of the bandlimited $Q^2PSK$ with the existing MSK scheme. We first consider the half sinusoid case ($Q^2PSKH$); the same analysis will also hold for the full sinusoid case ($Q^2PSKF$).

Thus we are assuming the 99% power bandwidth of MSK as the definition of channel bandwidth, i.e. W=1.2/T. The bit rate in MSK then being $R_b{}^{msk}=1/T$, the bandwidth efficiency is $b_{msk}=0.83$. The bit rate and the bandwidth efficiency of both $Q^2PSKH$ and $Q^2PSKF$ are $R_b{}^{q2PSK}=2/T$ and $b_{q^2psk}=1.66$ respectively. Thus there is one hundred percent increase in the bandwidth efficiency over MSK without any change in bandwith; this increase is evidently due to increase in the dimensionality of the signal space.

With the above definition of channel bandwidth an MSK signal gets through almost undistorted; so the energy efficiency is maintained at its ideal value of 9.6 db. A $Q^2PSKH$ scheme, on the other hand, when bandlimited to 1.2/T, allows transmission of only 91.13% of total spectral power. Thus there is a loss of some spectral components; this loss causes spread of the baseband data pulses which in turn causes intersymbol interference (ISI). The effect of this ISI can be equivalently considered as changing the signal space geometry. The following analysis will show that this change in the geometry results in an energy efficiency which is somewhat higher than the ideal value of 9.6 db.

In an attempt to find the new signal space geometry, it has been noted that because of the orthogonality of the two carriers, the spreading of the data pulses associated with either carrier does not have any ISI effect on the signal components associated with the other carrier. So the effect of bandlimiting on the geometry of the baseband signal space associated with either carrier can be analyzed separately and independently of the other. Once the bandlimited baseband signal space geometries are known, the overall signal space geometry of the bandlimited $Q^2PSK$ signal immediately follows from the product space of the individual baseband signal spaces.

Before bandlimiting, the baseband signal space geometries associated with both carriers are identical and each of them is biorthogonal. Since identical pair of data pulses are used on either carrier, after bandlimiting also the baseband geometries will remain identical; but due to ISI they will no longer remain biorthogonal. After bandlimiting, the baseband signal associated with either carrier is of the following form:

$$S^b_{q2pskh}(t) = \frac{A}{\sqrt{T}} \sum_{k=a}^{\infty} ((a_{1,k}p_{1b}(t - 2kT) + \quad (29)$$

$$a_{2,k}p_{2b}(t - 2kT)) \quad -T \leq t \leq T$$

Where A is an amplitude factor, $p_{1b}(t)$ and $P_{2b}(t)$ are the bandlimited versions of data pulses $P_1(t)$ and $P_2(t)$, and $a_{1,k}$'s being either $+1$ or $-1$ represent the information bits over the interval $(k-1)T<t<(k+1)T$.

Squaring both sides of (29) one can write the squared bandlimited signal as:

$$(S^b_{q2pskh}(t))^2 = \frac{A^2}{T} \Bigg( \sum_k \{p^2_{1b}(t - 2kT) + p^2_{2b}(t - 2kT)\} + \quad (30)$$

$$2 \sum_j \sum_{k(j \neq k)} a_{1,j}a_{1,k}p_{1b}(t - 2jT)p_{1b}(t - 2kT) +$$

$$2 \sum_j \sum_{k(j \neq k)} a_{2,j}a_{2,k}p_{2b}(t - 2jT)p_{2b}(t - 2kT) +$$

$$2 \sum_j \sum_k a_{1,j}a_{2,k}p_{1b}(t - 2jT)p_{2b}(t - 2kT) \Bigg)$$

The expected value of the squared signal is given by:

$$E(S^b_{q2pskh}(t))^2 = \frac{A^2}{T} \Bigg( \sum_k \{p^2_{1b}(t - 2kT) + \sum_k p^2_{2b}(t - 2kT) \Bigg) \quad (31)$$

where we used the facts that:

$$E(a_{1,j}a_{1,k}) = \delta_{jk} \quad (32a)$$

$$E(a_{2,j}a_{2,k}) = \delta_{jk} \quad (32b)$$

$$E(a_{1,j}a_{2,k}) = 0 \quad (32c)$$

where $\delta_{jk}$ is the Kronecker delta.

Hence the average energy per transmission of each bit is given by $$E_b = \frac{1}{2} \int_{-T}^{T} E(S^b_{q2pskh}(t))^2 \, dt \quad (33)$$

$$= \frac{1}{2} \frac{A^2}{T} \int_{-\infty}^{\infty} (p^2_{1b}(t) + p^2_{2b}(t)) \, dt$$

$$= 0.9113 \, A^2$$

In the above analysis we assumed that bandlimiting was carried away by an ideal bandpass filter placed symmetrically around the carrier. It may be useful to be noted that after this filtering, the truncated spectra $P_{1b}(f)$ and $P_{2b}(f)$ of the bandlimited pulses retain their even and odd symmetry around the carrier frequency $f_c$; as a result $p_{1b}(t)$ and $p_{2b}(t)$ are not time limited any more, but they maintain mutual orthogonality. In spite of that mutual orthogonality, finding the signal space geometry of the signal represented by (29) becomes virtually impossible unless we observe the following facts.

(i) With a bandwidth of 1.2/T, the data pulse $p_1(t)$ gets through almost undistorted; 99.1% of its total spectral power lies within that bandwidth. Therefore:

$$p_{1b}(t) \approx p_1(t) = \cos\frac{\pi t}{2T} \quad |t| \leq T \quad (34)$$

$$= 0 \quad |t| > T$$

(ii) With a bandwidth of 1.2/T, the data pulse $P_2(t)$ gets through with only 83.17% of its total spectral power; of this 83.17% power, 82.5% is concentrated over $|t| \leq 3T$. Thus the bandlimited pulse $P_{2b}(t)$ concentrates most of its energy (99.2%) over $|t| \leq 3T$. So one can reasonably assume that $P_{2b}(t)$ is essentially of duration $(-3T, 3T)$. With the two observations mentioned above (29) reduces to $$s^b_{q2pskh}(t) = \frac{A}{\sqrt{T}} \left| a_{1,0} p_1(t) + \sum_{k=1}^{1} a_{2,k} p_{2b}(t - 2kT) \right| \quad (35)$$

$$= \frac{A}{\sqrt{T}} |a_{1,0} p_1(t) + a_{2,0} p_{2b}(t) + a_{2,-1} p_{2b}(t + 2kT) +$$

$$a_{2,1} p_{2b}(t - 2kT))$$

$$-T < t < T$$

In order to find the signal space geometry with respect to a basis set $$\left\{ \frac{1}{\sqrt{T}} p_1(t), \frac{1}{\sqrt{T}} p_2(t) \right\},$$

it is sufficient to look at $s_{q2psk}{}^b(t)$ over $|t| < T$. In the absence of the two ISI terms on the right hand side of (35), the signal point coordinates would have been one of the four possibilities: $A[a_{10}, a_{20}R(0)]$, where $R(0)$ is the time cross-correlation between $P_{2b}(t)$ and $P_2(t)$. But because of ISI, the signal points will also depend on the information bits $a_{2,-1}$ and $a_{2,1}$ which are immediate left and right to the observation bits $a_{1,0}$ and $a_{2,0}$. Thus signal space geometry is dependent on the data sequence; depending on the values of $a_{2,-1}$ and $a_{2,1}$, there are four possible geometries each with a probability of $\frac{1}{4}$.

Case I.

$$a_{2,-1} = +1, a_{2,1} = +1$$

With respect to the basis set $$\left\{ \frac{1}{\sqrt{T}} p_1(t), \frac{1}{\sqrt{T}} p_2(t) \right\},$$

the signal points are represented by the following set.

$$S_{+1,+1} = (x_1, y_1) \quad (36a)$$
$$S_{-1,+1} = (-x_1, y_1) \quad (36b)$$

$$S_{-1,-1} = (-x_1, -y_2) \quad (36c)$$

$$S_{+1,-1} = (x_1, -y_2) \quad (36d)$$

Where the subscripts on signal points S's represent the values of the observation bits $a_{10}$ and $a_{20}$ and the coordinate values are given by $$x_1 = \frac{A}{T} \int_{-T}^{T} \{p_1(t) + p_{2b}(t + T) + p_{2b}(t - T)\} p_1(t) \approx A \quad (37a)$$

$$y_1 = \frac{A}{T} \int_{-T}^{T} \{p_{2b}(t) + p_{2b}(t + T) + p_{2b}(t - T)\} p_2(t) \approx 0.7A \quad (37b)$$

-continued $$y_2 = \frac{A}{T} \int_{-T}^{T} \{-p_{2b}(t) + p_{2b}(t + T) + p_{2b}(t - T)\} p_2(t) \approx 0.96A \quad (37c)$$

Figure 9:
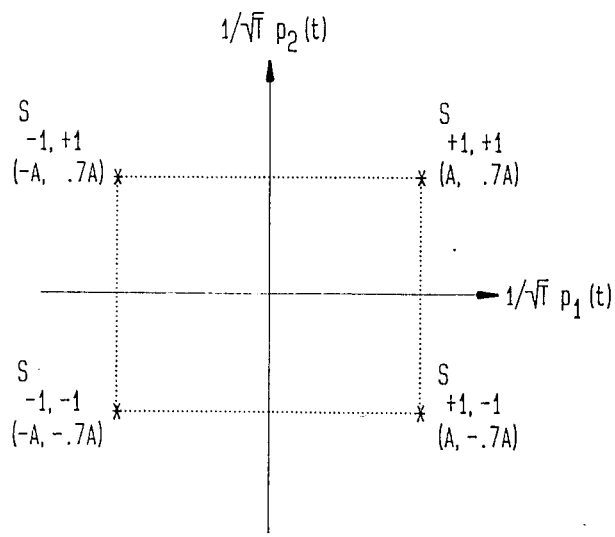
FIG. 9 is a graphical representation of the baseband signal space geometry of band-limited $Q^2$PSK.

The signal space geometry has been depicted in FIG. 9. It is to be noted that the geometry is a rectangular one with unequal sides. The signal points corresponding to other combinations of $a_{2,-1}$ and $a_{2,1}$ are summarized in the following table.

TABLE I

| Case $a_{2,-1}; a_{2,1}$ | I $+1,+1$ | II $-1,-1$ | III $+1,-1$ | IV $-1,+1$ |
|---|---|---|---|---|
| $S_{+1,+1}$ | $(x_1, y_1)$ | $(x_1, y_2)$ | $(x_2, y_3)$ | $(x_3, y_3)$ |
| $S_{-1,+1}$ | $(-x_1, y_1)$ | $(-x_1, y_2)$ | $(-x_3, y_3)$ | $(-x_2, y_3)$ |
| $S_{-1,-1}$ | $(-x_1, -y_2)$ | $(-x_1, -y_1)$ | $(-x_3, y_3)$ | $(-x_2, -y_3)$ |
| $S_{+1,-1}$ | $(x_1, -y_2)$ | $(x_1, -y_1)$ | $(x_2, -y_3)$ | $(x_3, -y_3)$ | where $x_1, y_1, y_2$ values are given in (37) and $x_2 \approx 0.99A, x_3 \approx 1.01A, y_3 \approx 0.83A$. The effect of bandlimiting on baseband signal space is thus to change the square (conventional biorthogonal) geometry into rectangular one. Now, if the two baseband signal spaces associated with two carriers are combined to form the product space, the original hyper cube geometry turns into a rectangular hyper parallelopiped of dimension four. The hyper paralleelopiped is not symmetrically palaced around the origin. It is important and interesting to note that the hyper parallelopiped sides are very much data dependent. Essentially there are sixteen different data dependent situations, each of which has equal probability of occurrence, but different parallelopiped for the signal space geometry. Since geometry is dependent on data sequence, a single particular receiver cannot be optimum in all situations. So one needs to look for a receiver which minimizes the overall bit error probability; in other words the receiver design should not be biased to any particular one of the sixteen different geometries.

We consider matched filterng followed by a binary decision on each of the four signal axes as a candidate for the receiver. In other words, we correlate the received signal with each of the four basis signals $\{s_i(t)\}$ given by (3) and take a binary decision on each of the four correlator outputs. As we see from Table I, the binary levels (e.g. $x_3 - 1.01A, -x_2 = -0.99A$ in case IV) at the correlator output are not equal in magnitude. So the optimum threshold which minimizes the probability of error lies at the midway of the two levels (e.g. $\frac{1}{2}(x_3 - x_2)$) and is different from zero level. This optimum threshold is a function of the data sequence and therefore is not tractable. In this situation, it should be observed that Table 1 reflects a particular harmony in the clustering of signal points; the coordinate levels $x_1$ (or $y_1$) are not all the same, yet occurrence of the positive level $x_1$ (or $y_1$) always accompanies, with equal probability, a negative level $-x_1$ (or $-y_1$). Therefore if we always set the binary threshold at zero level, the receiver will not favour any particular level in any biased way. With this setting of threshold the average bit error probability is given by, $$P_b(E) = \frac{1}{8}[2U(x_1) + U(x_2) + U(x_3) + U(y_1) + U(y_2) + 2U(y_3)] \quad (38)$$

where

-continued $$U(x) \approx Q\left[ 1.48 \left(\frac{x}{A}\right) \sqrt{\frac{E_b}{N_0}} \right] \quad (39)$$

and the function Q(.) has been defined in (11). It follows from (38) and (39) that the $E_b/N_0$ requirement in a bandlimited Q²PSKH for a bit error rate of $10^{-5}$ is 11.2 db while that for MSK is 9.6 db. Thus Q²PSKH achieves twice the bandwidth efficiency of MSK only at the expense of 45% increase in the average bit energy. A rigorous simulation of the Q²PSKH scheme confirmed this result to within 1.4% error, which probably resulted from the assumption that 99.1% of the spectral power lies within the bandwidth of 1.2/T. In comparison to Q²PSKH, the deteriorating effect of ISI is more severe in Q²PSKF Bit error probability given by (38) and (39) also holds for Q²PSKF except that the signal point coordinate values are different. Q²PSKF coordinate values are $x_1=1.0A, x_2=0.95A, x_3=1.05A; y_1=0.99A, y_2=0.64A, y_3=0.81A$; This leads to an energy efficiency $E_b/N_0=12.0$ db. Thus Q²PSKF achieves twice the bandwidth efficiency of MSK at the expense of 73% increase in the average bit energy. We set, therefore, that although Q²PSKF has faster asymptotic spectral fall off, Q²PSKH is superior to Q²PSKF in energy efficiency for the given definition of bandwidth as $W=1.2/T$. However, in an attempt to reduce the energy efficiency, any increase in bandwidth beyond 1.2/T does not help either of the two Q²PSK schemes much unless a substantial loss in the bandwidth efficiency is suffered. So, between two Q²PSK schemes. Q²PSKH is the better one to MSK to increase the bandwidth efficiency by a factor of two over MSK.

To achieve twice the bandwidth efficiency of MSK, Q²PSKH costs about a 45% increase in the average bit energy. One may like to compare this increase with the increase in bit energy required for a multilevel MSK having the same bandwidth efficiency as bandlimited Q²PSKH. The set of four signals used in ordinary MSK is biorthogonal (square geometry); the data pulse associated with each of the two carriers is either a positive or a negative cosine pulse of duration 2T, i.e. the possible numbers of levels in the basic data pulse is two. For a multilevel MSK in order to achieve twice the bandwidth efficiency of biorthogonal MSK, the number of amplitude levels in the data pulse must be four. In the next section we do the analysis for energy efficiency of four-level MSK and compare this scheme with bandlimited Q²PSKH.

The 99% power bandwidth (W) of Q PSKF is 1.75/T, where 2/T is the bit rate ($R_b$). With this as the definition of channel bandwidth, there will be no noticeable intersymbol interference (ISI) at the receiver, and therefore, energy efficiency will be retained at 9.6 db, as is the case of MSK. The band width efficiency will be $R_b/W=1.14$ which is 37% higher than the value 0.83 of MSK. Q²PSKF is a constant phase frequency shift keying (CPFSK) which increases the bandwidth efficiency by 37% over MSK without any requirement of increase in the average bit energy.

Q²PSK vs MTULTILEVEL MSK

Figure 1:
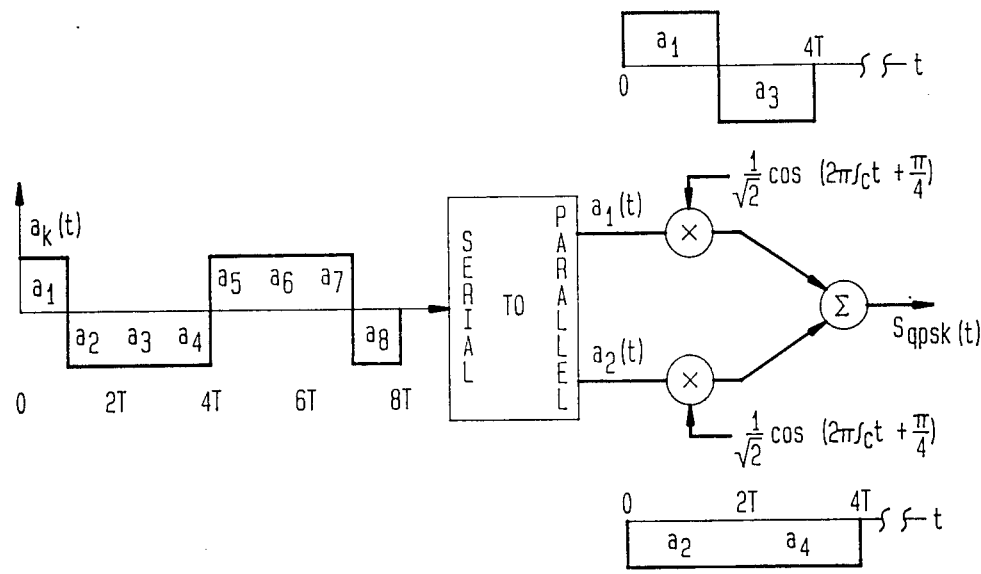
FIG. 1 is a function block and partially schematic representation of a quadrature phase shift keying modulator.
Figure 2:
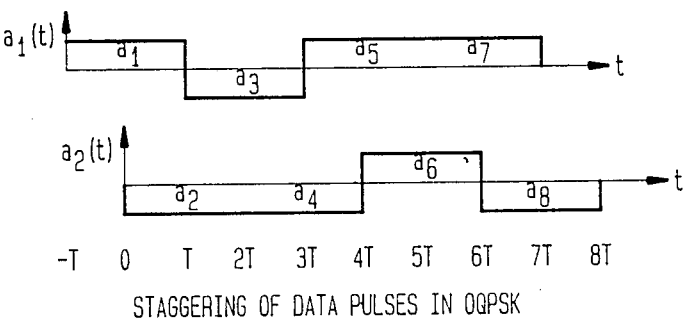
FIG. 2 is a timing diagram comparing staggered data pulses in an OQPSK system and an MSK system.
Figure 2:
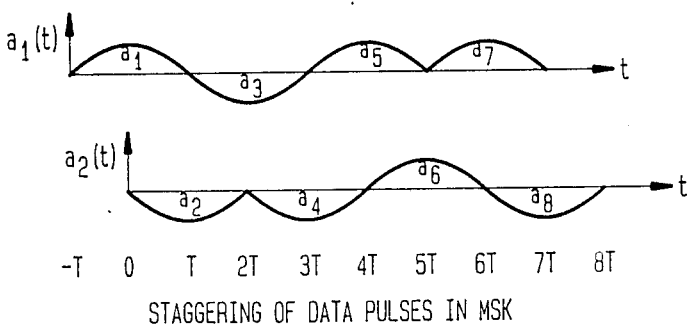
Figure 10:
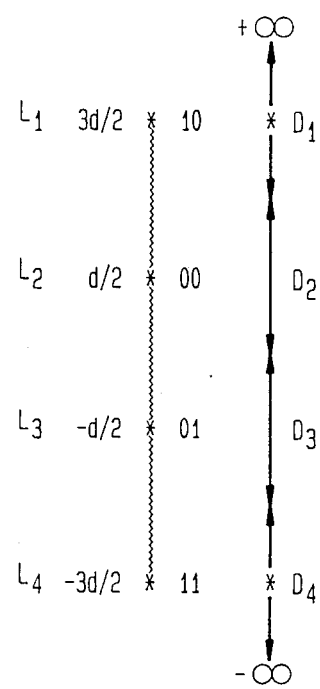
FIG. 10 is a diagrammatic representation of a coding scheme for four-level MSK.
Figure 11:
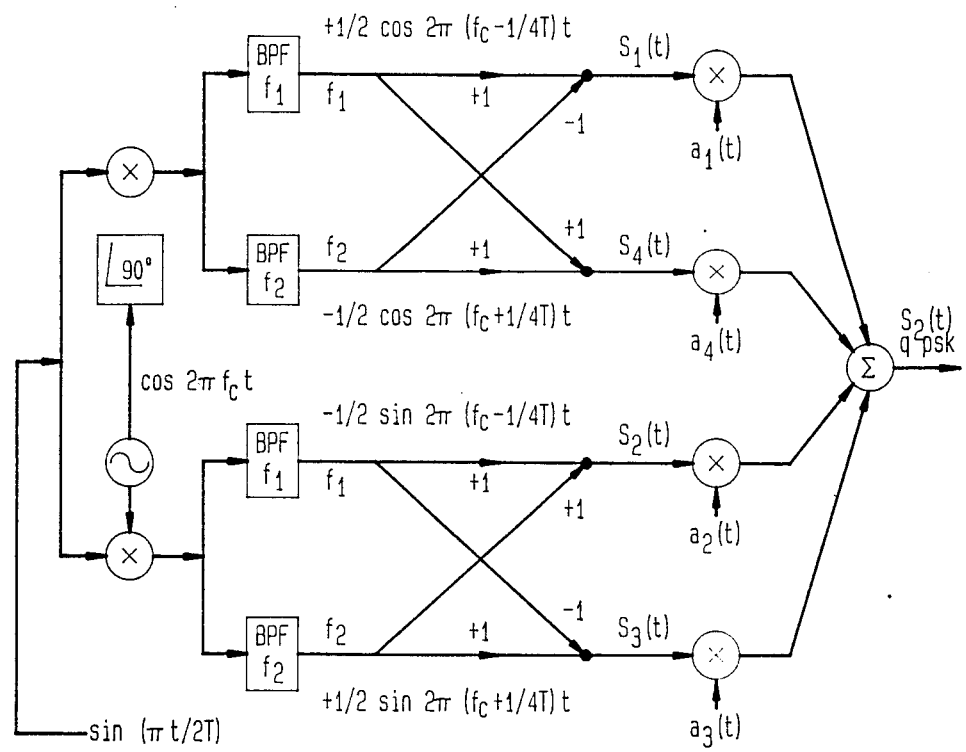
FIG. 11 is a function block representation of a $Q^2$PSKH modulator constructed in accordance with the principles of the invention.

The four level MSK scheme is similar to the conventional biorthogonal MSK scheme except the fact that here each pair of input data bits (each bit being of duration T/2) is first coded by a 2:1 coder into one of the four possible levels $L_i$, i=1,2,3,4. The stream of coded levels (each level being of duration T) is then treated as the input to a conventional MSK modulator. So, the amplitude of the coside shaped data pulses, as described in FIG. 2, instead of being only +1 or −1, takes one of the four values from the set $\{L_1\}_{i=1}^4$ as shown in FIG. 10. This four level scheme therefore accepts twice as many input data bits as ordinary MSK. To minimize the average bit energy requirement for a given probability of error, the amplitude levels are assumed to be placed symmetrically around origin as illustrated in FIG. 11. The optimum decision regions $D_1$ for each level $L_1$ are also shown. The coding has been performed in such a way that adjacent levels differ by one bit only; this will reduce the average bit error rate. If we maintain the 99% power bandwidth (W=1.2/T) as the channel bandwidth, ther will be no noticeable intersymbol interference. In that situation, the channel is completely defined by a set of probabilities $\{P_{i,j}\}_{i,j=1}^4$ where $p_{ij}$ is the probability that level $L_1$ is transmitted and $L_1$ is detected. The average bit error probability is given by, $$P_b(E) = \frac{1}{4} \sum_{i=1}^{4} P_{bi} \quad (40)$$

where $P_{bi}$ is the bit error probability if only the $i^{th}$ level were allowed to be transmitted. By trivial reasoning one can write $$P_{b1}=\tfrac{1}{2}(p_{12}+2p_{13}+p_{14}) \quad (41a)$$

$$P_{b2}=\tfrac{1}{2}(p_{21}+p_{23}+2p_{24}) \quad (41b)$$

and by symmetry, $$P_{b4}=P_{b1} \quad (42a)$$

$$P_{b3}=P_{b2} \quad (42b)$$

$$p_{12}=p_{23} \quad (42c)$$

Hence the average bit error probability is $$P_b(E)=\tfrac{1}{4}(2p_{12}+2p_{13}+2p_{24}+p_{14}+p_{21}) \quad (43)$$

Now referring to FIG. 11 and writing n(t) for the flat noise component, $$p_{12} = \text{Prob}\left(-\frac{d}{2} > n(t) > -\frac{3d}{1}\right) \quad (44a)$$

$$= Q\left(\frac{d/2}{\sqrt{N_0/2}}\right) - Q\left(\frac{3d/2}{\sqrt{N_0/2}}\right)$$

$$= Q(r) - Q(3r)$$

where, $$r = \sqrt{\frac{4E_b}{N_0}}$$

and $$E_b = \frac{5d^2}{8}$$

is the average bit energy.
Similarly, $$p_{13} = Q(3r) - Q(5r) \tag{44b}$$

$$p_{14} = Q(5r) \tag{44c}$$

$$p_{21} = Q(r) \tag{44d}$$

$$p_{24} = Q(3r) \tag{44e}$$

Hence the average bit error probability is $$P_b(E) = \tfrac{1}{4}[3Q(r) + 2Q(3r) - Q(5r)] \tag{45}$$

It follows from (45) that for a bit error rate of $10^{-5}$, a four-level MSK requires 13.4 db $E_b/N_0$. Thus in achieving twice bandwidth efficiency of biorthogonal MSK, the four-level MSK requires about 142% increase in the average bit energy; whereas with Q²PSKH and Q²PSKF the increments are 45% and 73% respectively. Thus Q²PSKH turns out to be a more energy efficient candidate to increase the bandwidth efficiency by a factor of two over ordinary or biorthogonal MSK. Henceforth whenever we mention Q²PSK we mean Q²PSKH. Results of this section are summarized in the following table.

TABLE II

| Type of modulation | MSK biorthogonal | Q²PSKH | Q²PSKF | MSK Four-level |
|---|---|---|---|---|
| Bandwidth efficiency | 0.83 | 1.66 | 1.66 | 1.66 |
| $E_b/N_0$ for $P_b(E) = 10^{-6}$ | 9.6 db | 11.2 db | 12.0 db | 13.4 db |

Signal duration = 2T
Bandwidth = 1.2/T

Q²PSK MODULATOR DEMODULATOR AND SYNCHRONIZATION SCHEME

A block diagram of a Q²PSK (or Q²PSKH) modulator is shown in FIG. 11. Two phase coherent sine and cosine carriers are multiplied by an external clock signal at one eighth the bit rate to produce phase coherent sine and cosine signals of frequencies $f_1 = f_c - (1/4T)$ and $f_2 = f_c + (1/4T)$. These signals are then separated by means of narrow bandpass filters and combined with appropriate polarity to form the basis signal set $\{S_i(t)\}_{i=1}^4$ of equation (3). The advantage of deriving the basis signals in this fashion (instead of generating them independently) is that the signal coherence and the deviation ratio are largely unaffected by any small variation in the incoming data rate. These basis signals are multiplied by the demultiplexed data streams and then added to form the Q²PSK signal defined in eq.(6).

Figure 12:
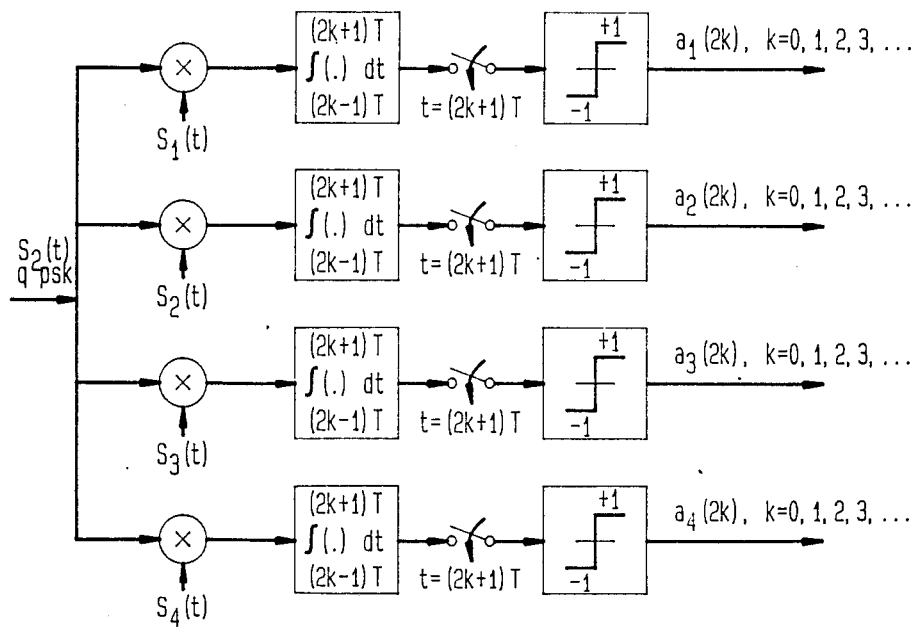
FIG. 12 is a function block representation of a $Q^2$PSK demodulator constructed in accordance with the invention.

A block diagram of the Q²PSK demodulator is shown in FIG. 12. The received signal (which is given by eq.(6) in the absence of noise and ISI) is multiplied by each of the basis signals individually and integrated over an interval of 2T. This multiplier-integrator combination constitutes correlation detection or matched filtering, an optimum coherent receiver in absence of ISI. Binary decisions followed by integrators give an estimate of the four binary data streams $a_i(t)$, $i=1,2,3,4$.

Figure 13:
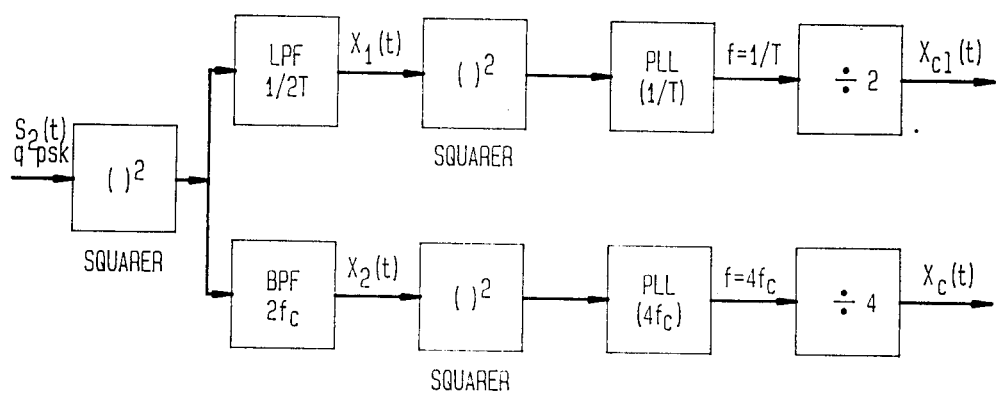
FIG. 13 is a function block representation of a synchronization arrangement for demodulating $Q^2$PSK signals.

One of the basic problems in coherent demodulation is the recovery of the modulating signal phase and bit timing information from the received signal. In the present situation, we need to recover the basis signal set $\{s_i(t)\}$ and a clock signal at one fourth the bit rate. These signals can be derived from the Q²PSK modulated signal by a nonlinear operation, such as squaring, and appropriate filtering as shown in FIG. 13.

If the Q²PSK modulated signal (eq.6) passes through a squaring device, at the output we get, $$s^2_{q2psk}(t) = 1 + \tfrac{1}{2}(a_1 a_2 + a_3 a_4) \sin\left(\frac{\pi t}{T}\right) + \tag{46}$$

$$\tfrac{1}{2}(a_1 a_2 - a_3 a_4) \sin\left(\frac{\pi t}{T}\right) \cos(4\pi f_c t) +$$

$$\cos(\theta_{12} - \theta_{34}) \sin(4\pi f_c t) +$$

$$\cos(\theta_{12} + \theta_{34}) \cos\left(\frac{\pi t}{T}\right) \sin(4\pi f_c t) +$$

$$\sin(\theta_{12} + \theta_{34}) \sin\left(\frac{\pi t}{T}\right) \sin(4\pi f_c t)$$

where, $$\theta_{12}(t) = \tan^{-1}\left(\frac{a_2(t)}{a_1(t)}\right) \tag{47a}$$

$$\theta_{34}(t) = \tan^{-1}\left(\frac{a_4(t)}{a_3(t)}\right) \tag{47b}$$

There are five components on the right of (46) which carry the required clocking and carrier phase information. But it can be shown that the expected value of each of these five components vanishes separately. So to recover the clocking and the carrier phase information, we need filtering and further nonlinear operation. By a lowpass and a bandpass filtering of the squared signal one may construct two signals $x_1(t)$ and $x_2(t)$ as $$x_1(t) = \tfrac{1}{2}(a_1 a_2 + a_3 a_4) \sin\left(\frac{\pi t}{T}\right) \tag{48}$$

$$x_2(t) = \cos(\theta_{12} - \theta_{34}) \sin(4\pi f_c t) \tag{49}$$

After squaring $x_1(t)$, $x_2(t)$ and taking the expectation one can show $$E(x_1^2(t)) = \tfrac{1}{4}\left(1 - \cos\frac{2\pi t}{T}\right) \tag{50}$$

$$E(x_2^2(t)) = \tfrac{1}{4}(1 - \cos 8\pi f_c t) \tag{51}$$

Thus, on the average, $x_1^2(t)$ and $x_2^2(t)$ contains spectral lines at 1/T and $4f_c$. One can use these lines to lock phase-locked loops (not shown) and carry out frequency divisions to recover the clocking and the carrier information as $$x_c(t) = \cos\frac{\pi t}{T} \tag{52}$$

and $$x_c(t) = \cos 2\pi f_c t$$

Signal $x_{c1}(t)$ provides timing information at a rate of one fourth the bit rate; this timing information is essential for sampling the integrator output in the demodulator (see FIG. 12). The basis signal set $\{s_i(t)\}$ required in the process of demodulation can be constructed easily by simple manipulation of the signals $x_{c1}(t)$ and $x_c(t)$. Recovery of $x_{c1}(t)$ and $x_c(t)$ from the received signal $s_{q2psk}(t)$ has been illustrated in block diagram in FIG. 13.

Although the invention has been described in terms of specific embodiments and applications, persons skilled in the art, in light of this teaching, can generate additional embodiments without exceeding the scope or departing from the spirit of the claimed invention. Accordingly, it is to be understood that the drawings and descriptions in this disclosure are proffered to facilitate comprehension of the invention and should not be construed to limit the scope thereof.

What is claimed is:

1. A modulation method for modulating simultaneously four streams of data pulses, the modulation method comprising the steps of:
    combining a pulse-shaping signal with respective ones of first and second carrier signal components, each of said first and second carrier signal components having the same frequency as the other and a quadrature phase relationship with respect to the other, to produce first and second composite modulation signals, each having first and second frequency components;
    combining substractively said first and second frequency components associated with each of said first and second composite modulation signals, to produce first and third modulation signals;
    combining additively said second and first frequency components associated with each of said first and second composite modulation signals, to produce second and fourth modulation signals; and
    combining said first, second, third, and fourth modulation signals with respective ones of the four streams of data pulses, to produce respectively corresponding first, second, third, and fourth modulated streams of pulses having predetermined pulse shapes and quadrature pulse phase relationships with respect to one another.

2. The modulation method of claim 1 wherein prior to performing said step of combining subtractively there is provided the further step of extracting said first and second frequency components from each of said first and second composite modulation signals.

3. The modulation method of claim 2 wherein said step of extracting is performed using band-pass filters.

4. The modulation method of claim 1 wherein there is further provided the step of summing said first, second, third, and fourth modulated streams of pulses to produce a modulated information signal having four dimensions.

5. A demodulation method of separating and recovering information from a carrier signal in a modulated information signal, the demodulated method comprising the steps of:
    squaring the modulated information signal to produce a squared modulated information signal having a plurality of signal components containing timing and carrier phase information;
    extracting a frequency-limited component of said squared modulated information signal, said frequency-limited component corresponding to a frequency of the information to be recovered;
    extracting a predetermined frequency component of said squared modulated information signal corresponding to an integer multiple of a frequency of the carrier signal;
    subjecting each of said extracted frequency-limited and predetermined frequency components to a non-linear operation;
    extracting from said non-linear operated frequency-limited component a first timing signal responsive to a frequency of the information in the modulated information signal;
    extracting from said non-linear operated predetermined frequency component a second timing signal having a frequency corresponding to that of the carrier signal; and
    separating first, second, third, and fourth modulated streams of pulses from the modulated information signal in response to said first and second timing signals.

6. The demodulation method of claim 5 wherein said step of subjecting comprises the step of squaring said extracted frequency-limited and predetermined frequency components.

7. The demodulation method of claim 5 where there are further provided the steps of:
    combining said first, second, third, and fourth modulated streams of pulses respectively with the modulated information signal to produce respective first, second, third, and fourth demodulated signals; and
    switching said first, second, third, and fourth demodulated signals in response to said first timing signal, to produce respective information signals.

8. An information transmission method wherein there are provided the steps of demultiplexing a stream of data pulses to form first and second demultiplexed data streams of demultiplexed data pulses, and combining said first and second demultiplexed data streams with respective ones of first and second carrier components, said respective carrier components having equal frequency and a quadrature phase relationship, the information transmission method further comprising the steps of:
    further demultiplexing the stream of data pulses for forming third and fourth data streams;
    combining said third and fourth demultiplexed data streams with respective ones of the first and second carrier components; and
    further combining the first and second and said third and fourth demultiplexed data streams with respective ones of first and second pulse-shaping signal components for modifying the shape of the demultiplexed data pulses to form a predetermined demultiplexed data pulse shape, said first and second pulse-shaping signal components having a quadrature phase relationship.

9. The information transmission method of claim 8 wherein said predetermined demultiplexed data pulse shape has a substantially sinusoidal shape.

10. The information transmission method of claim 8 wherein the step of demultiplexing and said step of further demultiplexing are performed simultaneously by transforming serial data into parallel data.

11. The information transmission method of claim 8 wherein the first and second carrier components are sinusoidal and cosinusoidal, respectively.

12. The information transmission method of claim 8 wherein said first and second pulse-shaping signal components are sinusoidal and cosinusoidal, respectively.

13. The information transmission method of claim 8 wherein there is provided the further step of summing the first and second and said third and fourth demultiplexed data streams after performing said steps of combining and further combining.

14. A method of transmitting an information signal contained in a stream of digital data, the method comprising the steps of:

demultiplexing the stream of digital data to produce a plurality of demultiplexed data streams, each containing a portion of the information signal;

combining respective ones of pulse-shaping components obtained from a set of orthogonal pulse-shaping components with respective ones of carriers obtained from a set of orthogonal carriers to form a set of orthogonal modulating signals which are independent of the information signal;

modulating each of said demultiplexed data streams in response to a respective modulating signal obtained from said set of orthogonal modulating signals;

summing said modulated demultiplexed data streams to form a composite waveform; and transmitting said composite waveform.

15. The method of claim 14 wherein said pulse-shaping components have a quadrature phase relationship with respect to each other.

16. The method of claim 15 wherein said pulse-shaping components are sinusoidal and cosinusoidal, respectively.

17. The method of claim 14 wherein said carrier components have quadrature phase relationship with respect to each other.

18. The method of claim 17 wherein said carrier components are sinusoidal and cosinusoidal, respectively.

* * * * *